United States Patent [19]

Gell

[11] Patent Number: 4,771,320

[45] Date of Patent: Sep. 13, 1988

[54] METHOD AND APPARATUS FOR EXTENDING THE DEPTH RANGE OF UNDERWATER EQUIPMENT

[75] Inventor: Harold Gell, Silver Spring, Md.

[73] Assignee: Sea Fathoms Industries, Silver Spring, Md.

[21] Appl. No.: 85,336

[22] Filed: Aug. 14, 1987

[51] Int. Cl.⁴ ............................................. G03B 17/08
[52] U.S. Cl. ...................................... 354/64; 114/312
[58] Field of Search ........................... 354/64; 114/312

[56] References Cited

U.S. PATENT DOCUMENTS

| | | | |
|---|---|---|---|
| 1,131,712 | 3/1915 | Klein | 114/312 |
| 3,759,605 | 9/1973 | Johnson | 354/64 X |
| 4,041,507 | 8/1977 | Ko et al. | 354/64 |
| 4,113,137 | 9/1978 | Wind | 354/64 X |

FOREIGN PATENT DOCUMENTS

| | | | |
|---|---|---|---|
| 2926224 | 1/1980 | Fed. Rep. of Germany | 354/64 |
| 1403770 | 11/1953 | France | 354/64 |

Primary Examiner—Michael L. Gellner
Attorney, Agent, or Firm—Harold Gell

[57] ABSTRACT

An apparatus and method for extending the depth range of an underwater pressure hull such as an underwater camera body by supplying gas to balance the internal hull pressure with the ambient water pressure. The balancing gas is supplied by a variable volume reservoir pneumatically connected to the pressure hull. The reservoir is reduced in volume by an increase in ambient water pressure to thereby increase the internal pressure of the system according to Boyle's Law. Conversely, a decrease in ambient water pressure results in an increase in the reservoir volume which reduces the internal hull pressure accordingly.

33 Claims, 3 Drawing Sheets

METHOD AND APPARATUS FOR EXTENDING THE DEPTH RANGE OF UNDERWATER EQUIPMENT

FIELD OF THE INVENTION

The present invention relates to a means to increase the depth range of an underwater pressure hull such as an underwater camera without increasing the strength of the structure or seals.

BACKGROUND OF THE INVENTION

Recent achievements in the microprocessor control field have led to the development of underwater cameras which utilize the basic camera case as the pressure hull. The majority of cameras of this type have a maximum operating limit from 3 to 10 meters. Operations within this range are accomplished with minimal changes to the basic camera bodies and therefore the camera price may be held low.

A few attempts have been made to increase the strength of the structure of the camera body so that the cameras may be utilized at greater depths and therefore render the cameras more practicable for underwater use. The maximum depth obtainable by increasing the camera structure is approximately 30 meters but the increased costs necessitated by the stronger camera body more than triples the retail cost of the camera, placing it out of range for the average sport diver.

OBJECTIVES OF THE INVENTION

Considering the shortcomings of the existing underwater cameras, it is a primary objective of the invention to provide a means whereby the operating depth of an underwater camera may be increased without increasing the physical structure.

Another objective of the invention is to provide a method for operating an underwater camera where the camera body is pressurized prior to commencing a dive.

A still further objective of the invention is to provide an underwater camera including means to pressurize the internal camera body in response to ambient pressure encountered during a dive.

Another objective of the invention is to provide a collapsible means to effectively increase the internal volume of an underwater camera. The collapsible means collapses due to the water pressure during a dive and thereby pressurizes the camera body and extend the operating depth of the camera.

SUMMARY OF THE INVENTION

The present invention contemplates a means to pressurize the interior of a pressure hull such as an underwater camera body combined with a pressure relief means whereby the camera body may be pressurized to a point below that which distortion of the body will occur. This point is approximately equal to the design operating depth of the camera body and the pressurization therefore results in doubling the depth at which the camera may be utilized.

In one embodiment of the invention, the pressurization port of the camera is attached to the second stage regulator of the diver's scuba system by a one-way valve. This pressurizes the camera to approximate ambient water pressure with each breath the diver takes. Thus there is no limit to the depth at which the camera may operate except for the limitations of the diver.

In another embodiment of the invention, a collapsible container is attached to the pressurization port of the camera body to increase the effective interior volume. As the camera is submerged, the body is collapsed to equalize the pressure within the camera. When the body is completely collapsed, the internal camera pressure equals the ambient water pressure. The camera then has the added depth range equivalent to its basic structural rating.

A still further embodiment is contemplated where the collapsible body is fabricated from a material which precludes expansion if the body is pressurized but will not interfere with the ready collapse under water pressure. By pressurizing this system, the operating depth of the camera can be greatly increased without adding excessive bulk to the accessory air volume storage means.

In a preferred embodiment, a hollow handle containing an inflatable bladder is secured to the camera body. The bladder is connected to the camera pressurization port and provides a source of pressure equalization gas.

In a still further embodiment, a handle includes a cylinder connected to the camera pressurization port. The other end of the cylinder is open. A free piston in the cylinder slides in response to the differential pressure between the camera body and ambient water pressure to equalize the internal pressure during descent or ascent.

DESCRIPTION OF THE INVENTION

Figure 1:
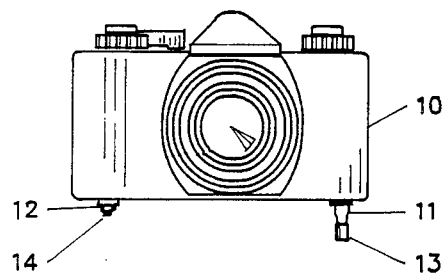
FIG. 1 is a front view of a camera illustrating the pressurization and pressure relief valves.

FIG. 1 illustrates a typical underwater camera with the camera body or case 10 used as the pressurization hull. The case is modified by including a one-way, pressurization valve 11. This valve may be similar to a common tire valve and its purpose is to allow the camera case to be pressurized by a simple hand pump or compressed air source. A pressure relief valve 12 is included in the camera body to prevent over pressurization of the camera. The use of a pressure relief valve simplifies pressurization by allowing an operator to apply a compressed air source to pressurization inlet valve 11 until safety valve 12 opens. Cap 13 seals the pressurization inlet valve 11 during dive operations to prevent water from entering the camera body when the external pressure exceeds the internal pressure.

This system allows operation of the camera at greater than design depths. For instance, the Cannon Aqua Snappy has a body with an operating design depth of one atmosphere or approximately 33 feet. According to this embodiment of the invention, the camera may be pressurized to at least that value. Thus the pressure relief valve 12 is set to open at one atmosphere above ambient. The camera body is pressurized until the relief valve opens to ensure that the internal pressure is one atmosphere above ambient. A protective cap 13 is placed over the pressurization inlet port 11 and the camera is ready for underwater operations. When the camera is submerged to its normal design structural limit of 33 feet, the pressure within the camera equals the external pressure of one atmosphere greater than sea level so there is no stress on the camera body. The camera may safely be submerged an additional 33 feet which places the camera at its new maximum operating depth which is a real pressure of three atmospheres. However, because the camera was pressurized to one atmosphere above sea level ambient pressure, the differential pressure at 66 feet is only one atmosphere and the camera is within its operating range.

The safety pressure relief valve 12 may include a manual pressure relief valve 14. This valve allows an operator to manually release the camera pressure so that the camera body may be opened to change film. In a preferred embodiment, the manual pressure relief valve 14 is recessed and requires a smaller diameter rod for actuation to preclude inadvertent operation while the camera is submerged.

Figure 2:
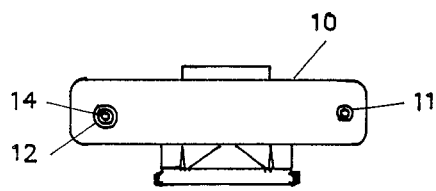
FIG. 2 is bottom view of a camera illustrating the pressurization and relief valves.

FIG. 2 is a bottom view of the embodiment discussed above.

Figures 3, 4:
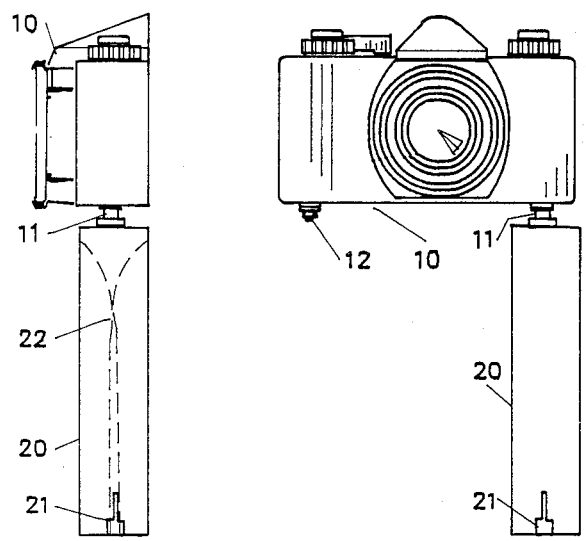
FIG. 3 is a front view of an underwater camera with a collapsible, auxiliary air volume attached.
FIG. 4 is a side view of an underwater camera with a collapsible, auxiliary air volume apparatus attached. The dashed lines illustrate the collapsed configuration.

FIG. 3 illustrates an alternate embodiment where a collapsible air container 20 is attached to air inlet port 11. In this embodiment, the one-way valve within air inlet port 11 is removed to allow the free exchange of pressure between the camera body 10 and auxiliary air container 20.

In a typical operation, air container 20 has a volume equal to the volume within the camera body. In this embodiment, pressure relief valve 12 is not necessary because the camera will never become over pressurized. As the camera is submerged, container 20 collapses to maintain the air pressure within the camera body 10 equal to the external water pressure. In the exemplary case, the container 20 has a volume equal to the interior of the camera case, when the camera has been submerged to a depth of 33 feet or one atmosphere, the container 20 is completely collapsed as illustrated by dashed lines in FIG. 4 and the differential pressure between the camera and the water is zero. The camera may now be submerged to a point where the differential pressure between the camera and the exterior equal the original design depth. If desired, container 20 may have a volume greater than the volume of the camera body to permit even deeper descents. For instance, if a Nikon Action Touch camera with a design depth of only 3 meters is fitted with a container 20 having an internal volume equal to four times the internal volume of the camera, the normally shallow water camera may be operated at depths as great as 140 feet.

The preceding operations are presented as being exemplary of a system which utilizes a camera body having a one-third atmosphere operating pressure differential. If the camera body strength is greater, the benefits of this invention are appropriately increased while if the operating differential pressures are less, the basic benefits of the system are likewise reduced.

Container 20 and attached camera body 10 may be pressurized through one-way valve 21. This valve is similar to that utilized in the embodiment illustrated in FIG. 1 or it may be a ball inflation valve of the type requiring a hollow needle. In this embodiment, the pressure relief valve 12 is a desirable item to prevent over pressurization of the camera body. Air bag 20 is fabricated from a material which is reinforced in such a manner that it will readily collapse but will not significantly expand when pressurized.

Assuming a camera case 10 capable of withstanding a differential pressure of one atmosphere such as the Cannon Aqua Snappy, the container/camera body is pressurized to the pressure differential limits of the camera body. When the camera is submerged to a depth of 33 feet or one atmosphere, the differential pressure is zero and the air bag 20 is on the verge of beginning to collapse. The camera may be submerged an additional 33 feet or to a total of 66 feet and upon reaching that depth, the air bag 20 has completely collapsed as illustrated by the dashed line representation 22 of FIG. 4 but the differential pressure which the camera body 10 is experiencing is still zero. The camera body may now be submerged an additional 33 feet to 99 feet (four atmospheres) where it experiences its maximum design depth limit differential of one atmosphere.

Figure 6:
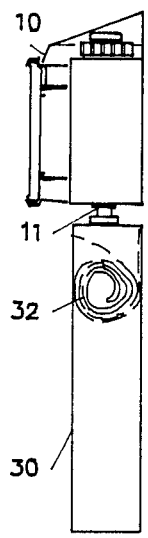
FIG. 6 is a side view of an underwater camera with a collapsible, auxiliary air volume apparatus attached illustrating in dash line the apparatus collapsed and rolled up.
Figure 5:
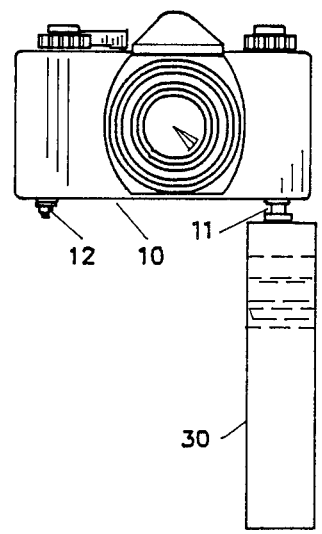
FIG. 5 is a front view of an underwater camera with a collapsible, auxiliary air volume apparatus attached illustrating in dashline the apparatus collapsed and rolled up.

FIGS. 5 and 6 are front and side views of an embodiment illustrating an auxiliary air chamber 30 which includes a coiling means whereby the container rolls into a coil as it collapses. The inflated configuration of the air container is illustrated by solid lines 30 in the figures and the collapsed, rolled condition is illustrated by dashed lines 32. Container 30 may be used exactly as described for container 20 illustrated in FIGS. 3 and 4.

Figure 7:
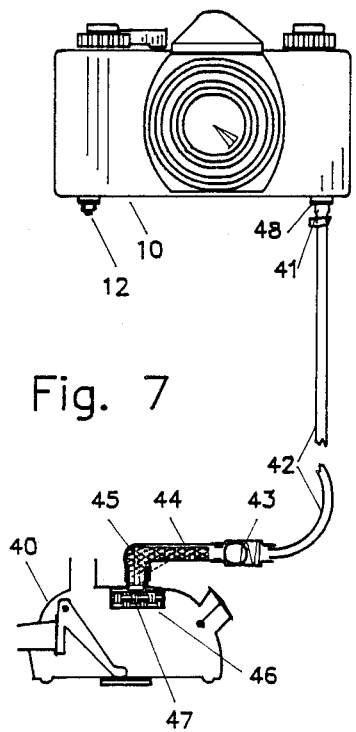
FIG. 7 illustrates an underwater camera with a pressurization equalization line attached to the low pressure, second stage regulator of a scuba apparatus.

FIG. 7 illustrates a still further embodiment of the invention. The camera body 10 is pneumatically coupled to the second stage regulator 40 of a self-contained underwater breathing apparatus. In the illustrated embodiment, a Nikon Action Touch camera having a design operating depth of 3 meters is modified by replacing the battery cap with a battery cap 43 having an air inlet port 41. The air inlet port may be similar to that illustrated in FIGS. 1 through 6 so that the camera may operate as illustrated in those embodiments. In the illustrated embodiment of FIG. 7, the air inlet port 41 is a hollow tube to which a heavy walled, small diameter neoprene tubing 42 is sealed to provide a pneumatic conduit to the second stage regulator 40.

The second stage regulator fitting includes a one-way valve 43 which protects the integrity of the breathing apparatus in the event of a malfunction of the camera or if the tube 42 is severed or torn loose. The one-way valve 43 allows air from the low pressure regulator 40 to pass through tubing 42 into the camera body but will prevent water from entering the regulator in the event that tube 42 is removed. The one-way valve is coupled to the second stage regulator 40 via a chamber 44 which may be filled with a desiccant 45 such as silica gel. The chamber is sealed to the second stage regulator and includes a termination inlet port 46 which contains a gas permeable vapor barrier 47. Air inlet port 46 is larger in diameter than the tubing to accommodate the greater surface area required to allow reasonable free passage of air from the second stage regulator into the conduit to the camera via the restriction of the gas permeable vapor barrier 47. This material will allow air to pass into the camera but prevent moisture from entering the system.

Figure 8:
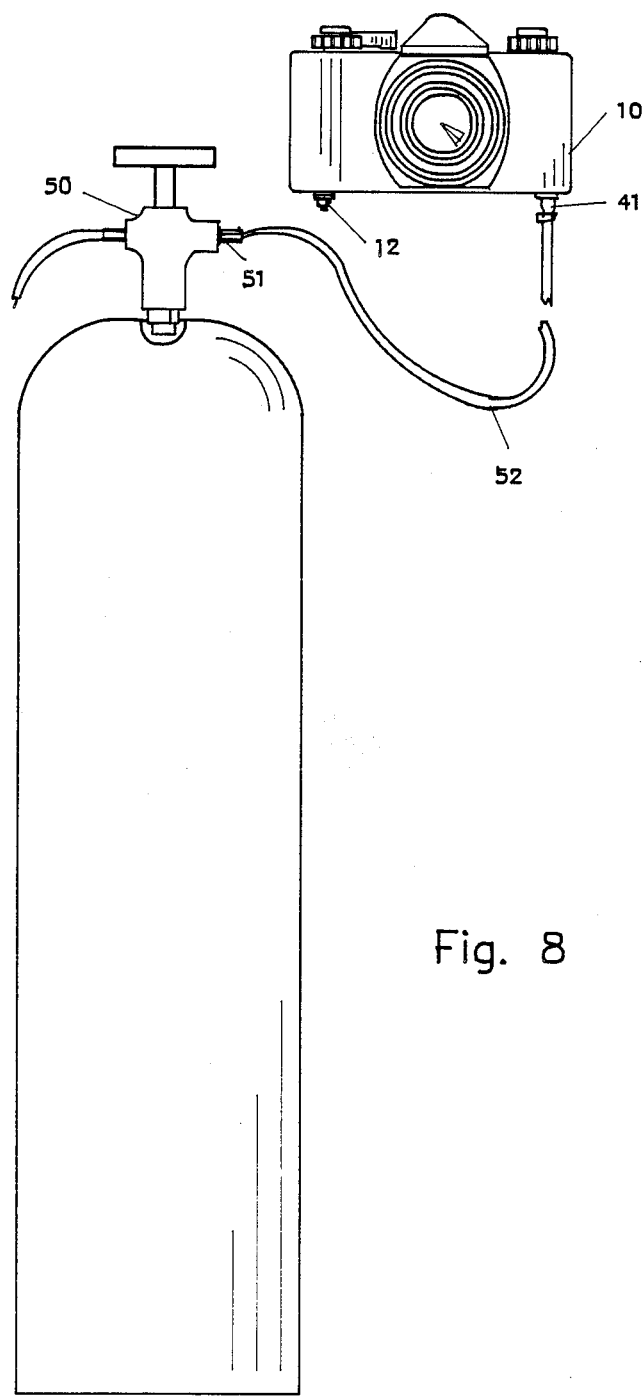
FIG. 8 illustrates an underwater camera with a pressurization line connected to the low pressure output of the first stage regulator of a scuba system.

FIG. 8 is an alternate embodiment usable with pressure hulls having a design strength capable of withstanding a pressurization equal to the low pressure output of the first stage regulator of a scuba system. In this embodiment, air line 52 is connected to a low pressure outlet of the first stage regulator 50 in much the same fashion as used to connect buoyancy controlled devices or second stage regulators to the first stage regulator of a scuba system. A quick release fitting 51 is used so that the operator may disconnect the system in the event of a failure of the line 52, pressure relief valve 12 or camera to prevent the total loss of air through the resultant open low pressure outlet.

In the embodiments illustrated in FIGS. 7 and 8, the pressure relief valve 12 automatically depressurize the pressure hull as the camera is raised to the surface. If the embodiment illustrated in FIG. 7 is modified by removing the one-way safety valve 43, the camera will automatically depressurize through the second stage regulator and safety valve 12 is not required.

The embodiments illustrated in FIGS. 7 and 8 will allow a diver to take the camera to any depth that the diver can survive.

In the embodiment illustrated in FIG. 7, a shallow water camera, such as the Nikon Action Touch camera which has a design depth of only 3 meters, may be used with comparative safety at any depth to which the diver can survive because the differential pressure between the camera and the ambient water pressure will remain at zero.

Figure 9:
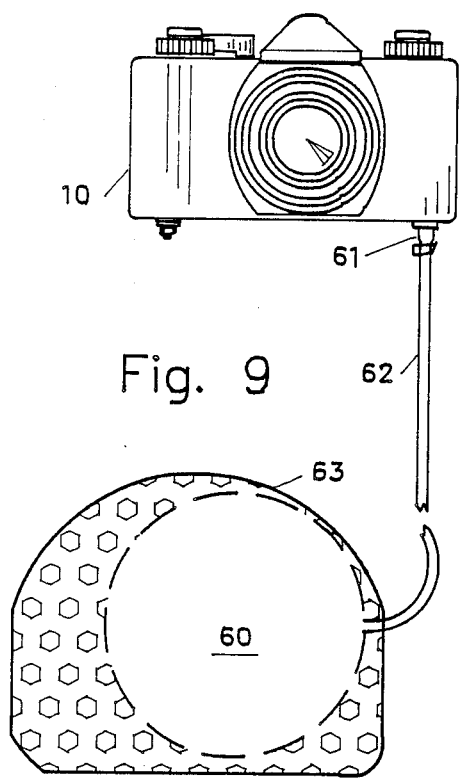
FIG. 9 illustrates an underwater camera with a pressure equalization line connected to a collapsible bladder located in a remote container.

FIG. 9 illustrates an embodiment which will allow a camera to be taken to depths equal to many times the design depth of the camera. It includes an air bladder 60 within a container 63 which may be strapped to the diver or the diver's apparatus. The air bladder may be large relative to the camera to permit operation at extreme depths. The air bladder 60 is coupled to the camera 10 via air line 62 and coupling 61 in a manner similar to that described for the embodiments illustrated in FIGS. 7 and 8. In the embodiment of FIG. 9, a pressure relief valve is not necessary because the camera will equalize on descent by the collapse of air bladder 60 and on ascent by the expansion of the air bladder.

Figure 10:
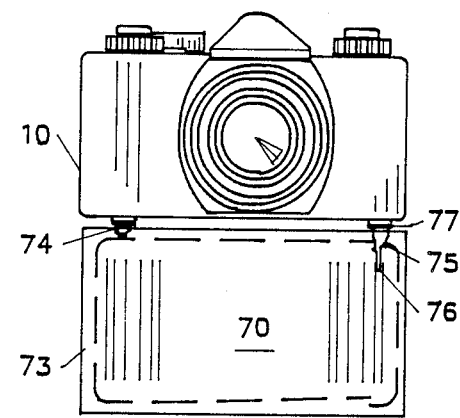
FIG. 10 illustrates an underwater camera with a hollow hand grip containing a collapsible bladder.

FIG. 10 is a further adaptation of the embodiment illustrated in FIG. 9 where the container or bag 70 is shaped in the form of a hollow handle 73 that may be secured to the camera body by the tripod attachment means 74. In this embodiment, a short air line may be used to couple bladder 70 to the camera or the bladder may be fitted with a sports ball needle valve 75 positioned to engage a hollow needle valve 76 threaded into the body of the camera. In the embodiment illustrated in FIG. 10, the battery cap 77 of the camera may be modified by boring a hole therethrough and tapping a 5/16-32 thread therein. The sports ball needle valve 76 may be threaded into the modified battery cap so that air bladder 70 will be connected directly to the camera through needle 76 by valve 75. The tripod retaining screw 78 holds the assembly securely to the base of the camera body 10 and bladder 70 is secured to the interior of the handle in the vicinity of valve 75 so that the bladder will not pull free from the valve needle 76 in the event that the camera is held underwater with the handle in the up position while the bladder is partially collapsed.

Figure 11:
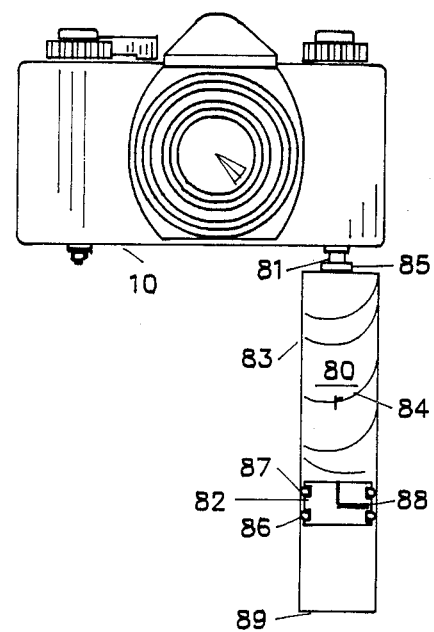
FIG. 11 illustrates an embodiment of the basic invention which includes a pressure responsive pump for pressurizing the camera case.
Figure 12:
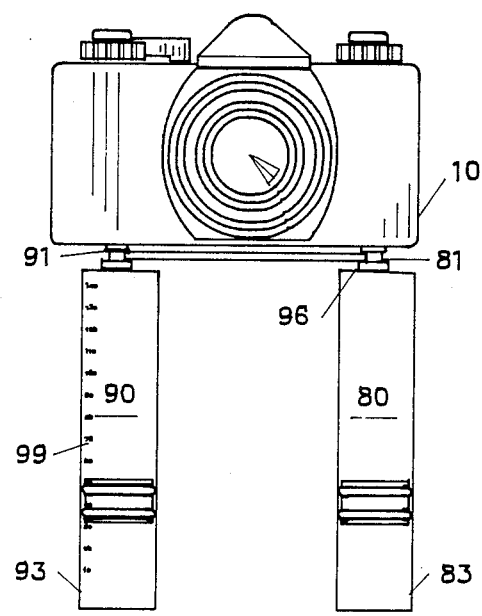
FIG. 12 illustrates the use of a pair of pressure responsive pumps for pressurizing an equipment pressure hull.

FIG. 11 illustrates an embodiment of the invention which uses a free piston pump 80 to pressurize the camera. The pump cylinder is pneumatically coupled to the air inlet of the camera body 81. The other end 84 of cylinder 80 is open to the ambient environment and a free piston 82 provides a movable gas tight seal within the cylinder. In operation, the free piston 82 is positioned at the end 89 of the cylindrical chamber 83 to provide a maximum volume between the upper surface of free piston 82 and the inlet port 81. The piston may be manually pushed into the extreme lower position by a rod or light spring 84 or simply by adding air pressure to the outlet port 85 which couples the pump to the camera inlet port 81. With the free piston 82 in the extreme down position, the pump 80 is secured to the air inlet port 81 of the camera body 10. As the assembly is submerged, external water pressure forces the free piston 82 towards the camera body, forcing air into the pressure vessel to equalize the pressure between the camera and ambient external water pressure. As the assembly ascends, the ambient pressure around the assembly is less than the pressure within the camera body so the pressure in the camera body forces the free piston 82 back down the cylinder 83 of the pump 80. The pressure is equalized within the camera body as the camera descends or ascends by movement of free piston 32. In a preferred application of this embodiment, pump 80 is configured to function as a handle.

The free piston 82 is illustrated sectioned on a plane parallel to and passing through the vertical axis to illustrate the compression "O" ring 86, the stabalizing "O" ring 87, and inner ring pressure equalization bore 88.

To increase the operational depth of the assembly, a second pump 90 may be attached as a second hand hold for the camera. The second pump 90 functions identically to the first. It may be provided with an independent portal into the camera body 10 or connected via a T connector 96 to the basic camera inlet port 81.

The cylinders 83 and 93 may be fabricated from any suitable material such as brass or steel but preferably they are fabricated from a transparent plastic so the diver may use the scale 99 as an alternate depth gauge, determine if the piston seals are leaking and ascertain when the maximum equalization depth has been reached.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. An apparatus for extending the operational depth of an underwater device of the class which includes a waterproof pressure hull, comprising:
   a pressurization port in said pressure hull;

a variable volume gas container fabricated from a flexible and resiliently expandable material and responsive to the differential pressure between ambient pressure and the pressure within said gas container for adjusting said variable volume so that the pressure within approximately equals the ambient external pressure; and a gas passage betwen said pressurization port and said variable volume gas container whereby the pressure within said waterproof pressure hull is adjusted solely by gas transfer between said variable volume gas container and said waterproof pressure hull.

2. An apparatus as defined in claim 1, wherein said gas passage includes a flexible conduit pneumatically coupling said gas container to said pressure hull.

3. An apparatus as defined in claim 1, further comprising means for inflating said gas container.

4. An apparatus as defined in claim 3 wherein said means for inflating said gas container comprises a sports ball needle valve.

5. An apparatus as defined in claim 4, wherein said gas passage comprises a hollow inflation needle of the type used with sports ball needle valves.

6. An apparatus as defined in claim 5, comprising second means for inflating said gas container.

7. An apparatus as defined in claim 6 wherein said second means for inflating said gas container is a second sports ball needle valve.

8. An apparatus as defined in claim 1, wherein said gas container includes a resilient memory means for rolling said gas container into a coil as the internal volume of said gas container is diminished.

9. An apparatus as defined in claim 1 wherein said gas passage includes a gas permeable, moisture barrier of the class which will allow air but not water to pass through said passage.

10. An apparatus as defined in claim 1, further comprising a container for said gas container.

11. An apparatus as defined in claim 10, further comprising means for securing said container to said containment vessel.

12. An apparatus as defined in claim 11 wherein said container includes a hollow handle means for holding said gas container.

13. An apparatus as defined in claim 1 wherein said pressurization port includes a bore through a battery access cap.

14. An apparatus for extending the operational depth of an underwater device of the class which includes a waterproof pressure hull, comprising:

a pressurization port in said pressure hull;

a cylinder pneumatically connected to said pressurization port at one end and open to ambient pressure at the other end; and a variable volume created by a piston within said cylinder configured and dimensioned to slide within said cylinder in response to differential pressure on opposite sides of said piston whereby the pressure within said waterproof pressure hull is adjusted solely by gas transfer between said variable volume and said waterproof pressure hull.

15. An apparatus as defined in claim 14 wherein said cylinder is configured to function as a handle for said pressure hull.

16. An apparatus as defined in claim 15, wherein said variable volume includes a plurality of cylinders and pistons similar in function to said cylinder and piston.

17. An apparatus for extending the operational depth of a waterproof pressure hull, comprising:

a gas passage into said pressure hull;

a variable volume gas fabricated from a flexible and resiliently expandable material;

means for pneumatically coupling said reservoir to said pressure hull via said gas passage; and means responsive to the differential pressure between ambient pressure and the pressure within said pressure hull for adjusting the internal volume of said reservoir so that the pressure within said pressure hull approximately equals the ambient external pressure.

18. An apparatus as defined in claim 17, wherein said reservoir is a bladder and said means for adjusting the internal volume of said reservoir is the flexibility and expandable resiliency of the material comprising said bladder.

19. An apparatus as defined in claim 18, wherein said gas passage includes a flexible conduit pneumatically coupling said reservoir to said pressure hull.

20. An apparatus as defined in claim 19, wherein said reservoir includes a sports ball needle valve.

21. An apparatus as defined in claim 20, wherein said gas passage includes a hollow inflation needle of the type used with sports ball needle valves.

22. An apparatus as defined in claim 18, further comprising means for inflating said reservoir.

23. An apparatus as defined in claim 22 wherein said means for inflating said reservoir comprises a second sports ball needle valve.

24. An apparatus as defined in claim 18, wherein said gas container includes a resilient means for rolling said reservoir into a coil as the internal volume of said reservoir is diminished.

25. An apparatus as defined in claim 18, further comprising a container for said bladder.

26. An apparatus as defined in claim 25 wherein said container includes a hollow handle means for holding said bladder.

27. An apparatus as defined in any of claims 1, through 26 wherein said pressure hull is a camera housing including moisture proof seal means for the lens assembly, control means and film access port.

28. A method of extending the operational depth of an underwater apparatus, including the steps of adding a gas to said underwater apparatus as it is submerged to equalize the pressure between the interior of said underwater apparatus and the ambient water pressure according to Boyle's Law by reducing the internal volume of a variable volume gas container fabricated from a flexible and resiliently expandable material pneumatically connected to said underwater apparatus in response to differential pressure between said internal volume and the ambient water pressure.

29. A method of extending the operational depth of an underwater apparatus as defined in claim 28 including the further steps of providing said variable volume in the form of a collapsible bladder subject to the ambient water pressure of the underwater apparatus whereby said ambient pressure forces gas from said container into said underwater apparatus.

30. A method of extending the operational depth of an underwater apparatus as defined in claim 28 wherein said apparatus is a camera, including the further steps of providing said variable volume in the form of a collapsible bladder subject to the ambient water pressure of the underwater camera whereby said ambient pressure forces gas from said container into said underwater camera.

31. A method of extending the operational depth of an underwater apparatus, including the steps of:

balancing the internal pressure of said underwater apparatus with the ambient water pressure by providing a gas source in the form of a differential pressure operated free piston subject to the ambient water pressure of the underwater apparatus whereby said ambient pressure forces said free piston into a cylinder causing gas in said cylinder to move into said underwater apparatus as the only source of pressure equalizing gas.

32. A method of extending the operational depth of an underwater apparatus as defined in claim 31 wherein said apparatus is a camera.

33. A method of extending the operational depth of an underwater camera, including the steps of compressing a gas container fabricated from a flexible and resiliently expandable material according to Boyle's Law by ambient water pressure to there by add gas to said underwater camera as it is submerged to equalize the pressure between the interior of said underwater camera and the ambient water pressure.

* * * * *